US011739538B2

(12) United States Patent
De Rick

(10) Patent No.: US 11,739,538 B2
(45) Date of Patent: *Aug. 29, 2023

(54) SET OF FLOOR PANELS AND METHOD FOR INSTALLING THIS SET OF FLOOR PANELS

(71) Applicant: FLOORING INDUSTRIES LIMITED, SARL, Bertrange (LU)

(72) Inventor: Jan Eddy De Rick, Geraardsbergen (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,007

(22) Filed: Sep. 24, 2021

(65) Prior Publication Data
US 2022/0064964 A1 Mar. 3, 2022

Related U.S. Application Data

(63) Continuation of application No. 16/960,945, filed as application No. PCT/IB2019/050216 on Jan. 11, 2019, now Pat. No. 11,208,814.

(Continued)

(51) Int. Cl.
E04F 15/00 (2006.01)
E04F 15/02 (2006.01)
E04F 15/10 (2006.01)

(52) U.S. Cl.
CPC ...... *E04F 15/02038* (2013.01); *E04F 15/107* (2013.01); *B32B 2471/00* (2013.01);
(Continued)

(58) Field of Classification Search
CPC .......... E04F 15/02033; E04F 15/02038; E04F 15/107; E04F 15/102; E04F 2201/042; E04F 2201/0107; E04F 2201/03; E04F 15/105; E04F 2201/0115; E04F 2201/0153; E04F 2201/0552; E04F 2201/023; E04F 2201/0535; E04F 2201/0146;
(Continued)

(56) References Cited

U.S. PATENT DOCUMENTS 9,156,233 B2 10/2015 Dossche et al.
10,280,627 B2 5/2019 De Rick et al.
(Continued)

FOREIGN PATENT DOCUMENTS

WO 9747834 A1 12/1997
WO 2005098163 A1 10/2005
(Continued)

OTHER PUBLICATIONS

International Search Report and Written Opinion from PCT Application No. PCT/IB2019/050216, dated Apr. 8, 2019.

*Primary Examiner* — Chi Q Nguyen
(74) *Attorney, Agent, or Firm* — WORKMAN NYDEGGER

(57) ABSTRACT

A set of floor panels includes floor panels that are oblong rectangular and have a pair of long edges and a pair of short edges. The long and the short edges are provided with mechanical coupling parts, which allow coupling the floor panels of the set to each other such that a herringbone pattern can be realized herewith.

19 Claims, 10 Drawing Sheets

Related U.S. Application Data

(60) Provisional application No. 62/616,258, filed on Jan. 11, 2018.

(52) U.S. Cl.
CPC ..... *E04F 15/105* (2013.01); *E04F 2201/0115* (2013.01); *E04F 2201/0153* (2013.01); *E04F 2201/043* (2013.01)

(58) Field of Classification Search
CPC ........ E04F 2201/043; E04F 2201/0547; E04F 2201/0138; B32B 2471/00
USPC .. 52/592.1, 592.3, 592.2, 578, 588.1, 309.1, 52/309.3
See application file for complete search history.

(56) References Cited

U.S. PATENT DOCUMENTS

| | | | |
|---|---|---|---|
| 10,612,250 B2 | 4/2020 | De Rick et al. | |
| 10,648,182 B2 | 5/2020 | De Rick et al. | |
| 10,683,668 B2 | 6/2020 | De Rick et al. | |
| 10,697,187 B2 * | 6/2020 | Pervan | E04F 15/04 |
| 10,815,677 B2 | 10/2020 | De Rick et al. | |
| 11,053,693 B2 * | 7/2021 | De Rick | E04F 15/02038 |
| 11,208,814 B2 * | 12/2021 | De Rick | E04F 15/107 |
| 2004/0168392 A1 * | 9/2004 | Konzelmann | E04F 15/04 |
| | | | 52/592.1 |
| 2004/0250492 A1 * | 12/2004 | Becker | E04F 15/04 |
| | | | 52/578 |
| 2008/0134607 A1 | 6/2008 | Pervan et al. | |
| 2009/0133353 A1 | 5/2009 | Pervan et al. | |
| 2009/0249733 A1 | 10/2009 | Moebus | |
| 2010/0281803 A1 * | 11/2010 | Cappelle | E04F 15/02 |
| | | | 52/309.1 |
| 2011/0280655 A1 * | 11/2011 | Maertens | A47B 96/201 |
| | | | 403/375 |
| 2012/0180416 A1 | 7/2012 | Perra et al. | |
| 2013/0104485 A1 * | 5/2013 | Meersseman | B44C 5/0476 |
| | | | 428/53 |
| 2014/0283466 A1 | 9/2014 | Boo | |
| 2016/0177577 A1 * | 6/2016 | Cappelle | B65D 85/62 |
| | | | 52/582.2 |
| 2017/0067261 A1 | 3/2017 | Hannig et al. | |
| 2018/0010342 A1 | 1/2018 | Van Hooydonck | |
| 2018/0094441 A1 | 4/2018 | Boo | |
| 2019/0161975 A1 * | 5/2019 | Simon | E04F 15/105 |
| 2019/0211569 A1 | 7/2019 | Boo et al. | |
| 2020/0131874 A1 * | 4/2020 | Cajiles | E21B 27/00 |
| 2021/0030303 A1 * | 2/2021 | Gärber | A61B 5/7246 |
| 2022/0118644 A1 * | 4/2022 | De Rick | F16B 5/0012 |

FOREIGN PATENT DOCUMENTS

| | | |
|---|---|---|
| WO | 2017115202 A1 | 7/2017 |
| WO | 2017187298 A2 | 11/2017 |

* cited by examiner

SET OF FLOOR PANELS AND METHOD FOR INSTALLING THIS SET OF FLOOR PANELS

BACKGROUND

The present invention relates to a set of floor panels which is suitable for forming a floor covering, as well as to a method for installing this set of floor panels. More particularly, it relates to a set of floor panels which are provided with specific coupling parts at their edges.

The set may be composed of floor panels which, according to a first possibility, all, in respect to coupling parts at the edges thereof, are realized the same or similar, as well as which, according to a second possibility, consist of floor panels amongst which, in respect to the configuration of the coupling parts, two or more types are present per set, with as a typical example floor panels which comprise two types, such that they can be installed in a herringbone pattern, wherein the distribution of male and female coupling parts along the circumference of the floor panels then is different for the two types of floor panels, more particularly is mirrored in mutual respect.

Preferably, the floor panels are oblong rectangular and thus have a pair of long edges and a pair of short edges. Both the long and the short edges are provided with mechanical coupling parts, which allow that the floor panels can be coupled to each other.

Preferably, the coupling parts on all four edges are realized in one piece from the material of the floor panel, preferably by means of a machining treatment, for example, a milling process. By "realized in one piece from the material of the floor panel" is meant that in the production no significant separate parts, such as locking strips or the like, still have to be provided on the edges already formed by machining. However, this does not exclude that it can be started with a floor panel with a substrate that has an edge portion consisting of a material which is different from the material substantially applied in the floor panel, wherein the one-piece coupling part then is formed entirely or partially in this edge portion. This can be the case, as is known, with so-called "engineered wood" panels.

The type of sets of floor panels as intended by the present invention is known, amongst others, from the international patent application WO 2017/187298 A2 in the name of applicant. This international patent application WO 2017/187298 A2 and all information comprised therein thus also has to be considered as incorporated in the present application by way of reference, wherein all characteristics or partial characteristics mentioned in the WO 2017/187298 A2 can be combined with the floor panels, described in the present invention, of the invention, in all possible combinations, thus as far as such combination does not lead to any contradictions.

SUMMARY

The present invention primarily aims at an alternative set of floor panels which, at least in a certain embodiment thereof, is suitable for forming a floor covering in herringbone pattern. In particular, it is an aim of the invention to provide floor panels which, on the one hand, can be smoothly installed in herringbone pattern and, on the other hand, can be firmly coupled to each other, such that the risk of height difference, gap or slit formation between the mutually coupled floor panels can be minimized.

The invention provides various independent aspects, which meet the intended aims.

To this aim, the invention, according to a first aspect, relates to a set of floor panels, wherein these floor panels are oblong rectangular and thus have a pair of long edges and a pair of short edges; wherein the long as well as the short edges are provided with mechanical coupling parts, which allow coupling the floor panels of the set to each other; wherein the one long edge is provided with a male coupling part and the other long edge is provided with a female coupling part; wherein the one short edge is provided with a male coupling part and the other short edge is provided with a female coupling part; wherein the male coupling part at the long edge can be inserted into the female coupling part at the long edge of a floor panel of the set by means of a turning movement; wherein the male coupling part at the long edge can also be inserted into the female coupling part at the short edge of a floor panel of the set by means of a turning movement; and wherein the male coupling part at the short edge can be inserted into the female coupling part at the long edge in one and the same turning movement which is used for inserting the male coupling part at the long edge into the female coupling part at the long or short edge; wherein the male coupling part at the short edge and the female coupling part at the long edge comprise locking parts, generally spoken locking means, which, in a mutually coupled condition of such short edge and long edge, effect a locking in horizontal direction as well as a locking in vertical direction; wherein the female coupling part at the long edge and/or short edge comprises a lateral groove, which is bordered by an upper lip and a lower lip, of which the lower lip extends distally to beyond the upper lip and is provided with an upwardly directed locking part; wherein the male coupling part at the long edge is provided with a tongue, which, in the coupled condition, can cooperate with the aforementioned lateral groove in order to effect a vertical locking; and wherein the set of floor panels comprises at least one pair of locking portions in order to effect the aforementioned vertical locking of the male coupling part of the short edge in the female coupling part at the long edge, namely a first locking portion at this male coupling part and a second locking portion, cooperating therewith in coupled condition, at the female coupling part; with the characteristic that the aforementioned second locking portion, which is present at the female coupling part, is situated at the proximal side of the aforementioned upwardly directed locking part.

According to preferred embodiments, the set of floor panels of the first aspect can show one or more of the following subordinate characteristics, wherein each of these subordinate characteristics can be present separately or in any mutual combination, as far as such combination does not have any contradictory characteristics:

the characteristic that the aforementioned second locking portion consists of an undercut, preferably in the form of an inclined surface under which the first locking part can engage; the characteristic that the respective coupling parts are configured such that the first locking portion can be brought behind the second locking portion by means of a downward movement of the respective coupling part, more particularly by means of a downward snap movement;

the characteristic that the male coupling part at the short edge comprises a flange extending laterally at the top, at which a downwardly extending locking part is situated, and that for the aforementioned vertical locking another pair of locking portions is provided, of which one locking portion is situated at the distal end of the aforementioned flange and/or of the downwardly extending locking part, whereas then the other locking portion is situated at the opposite floor panel;

the characteristic that for the aforementioned vertical locking an additional pair of locking portions is provided, of which one locking portion is situated at the distal end of the aforementioned lower lip and/or of the upwardly directed locking part, whereas then the other locking portion is situated at the opposite floor panel;

the characteristic that the locking portion which is situated at the distal end of the aforementioned upper lip and/or the upwardly directed locking part, consists of a protrusion or recess, whereas the cooperating therewith locking portion then consists of a recess or protrusion, respectively, wherein such protrusion can consist, for example, of a bulge-shaped portion;

the characteristic that the coupling parts on all four edges are realized in one piece from the material of the floor panels;

the characteristic that the female coupling part at the short edge and the female coupling part at the long edge are realized substantially similar to each other and preferably are realized identical to each other;

the characteristic that at the underside of the female coupling part of the long edge and/or short edge a recess is present, which recess facilitates an elastic bending during joining.

According to a second aspect, the invention relates to a set of floor panels, wherein these floor panels are oblong rectangular and thus have a pair of long edges and a pair of short edges; wherein the long as well as the short edges are provided with mechanical coupling parts, which allow coupling the floor panels of the set to each other; wherein the one long edge is provided with a male coupling part and the other long edge is provided with a female coupling part; wherein the one short edge is provided with a male coupling part and the other short edge is provided with a female coupling part; wherein the male coupling part at the long edge can be inserted into the female coupling part at the long edge of a floor panel of the set by means of a turning movement; wherein the male coupling part at the long edge can also be inserted into the female coupling part at the short edge of a floor panel of the set by means of a turning movement; and wherein the male coupling part at the short edge can be inserted into the female coupling part at the long edge in one and the same turning movement which is used for inserting the male coupling part at the long edge into the female coupling part at the long or short edge; wherein the male coupling part at the short edge and the female coupling part at the long edge comprise locking parts, generally spoken locking means, which, in a mutually coupled condition of such short edge and long edge, effect a locking in horizontal direction as well as a locking in vertical direction; wherein the female coupling part at the long edge and/or short edge comprises a lateral groove, which is bordered by an upper lip and a lower lip, of which the lower lip extends distally to beyond the upper lip and is provided with an upwardly directed locking part; wherein the male coupling part at the long edge is provided with a tongue, which, in the coupled condition, can cooperate with the aforementioned lateral groove in order to effect a vertical locking, and wherein the set of floor panels comprises at least one pair of locking portions in order to effect the aforementioned vertical coupling of the male coupling part of the short edge in the female coupling part at the long edge, namely a first locking portion at this male coupling part and a second locking portion, cooperating therewith in coupled condition, at the female coupling part, with the characteristic that the aforementioned second locking portion, which is present at the female coupling part, is situated at the distal end of the lower lip and/or of the upwardly directed locking part, whereas then the other first locking portion mentioned herein above then is situated at the opposite floor panel. Herein, the term "male coupling part" must be interpreted as being the entire edge profile comprising this male coupling part.

According to preferred embodiments, the set of floor panels of the second aspect can show one or more of the following subordinate characteristics, wherein each of these subordinate characteristics can be present separately or in any mutual combination, as far as such combination does not have any contradictory characteristics:

the characteristic that the locking portion which is situated at the distal end of the aforementioned lower lip and/or of the upwardly directed locking part, consists of a protrusion or recess, whereas the cooperating therewith locking portion then consists of a recess or protrusion, respectively, wherein such protrusion can consist, for example, of a bulge-shaped portion;

the characteristic that the respective coupling parts are configured such that the first and second locking portion can be brought into engagement by means of a downward movement of the respective coupling parts, more particularly by means of a downward snap movement;

the characteristic that the male coupling part at the short edge comprises a flange extending laterally at the top, at which a downwardly extending locking part is situated, and that for the aforementioned vertical locking an additional pair of locking portions is provided, of which one locking portion is situated at the distal end of the aforementioned flange and/or of the downwardly extending locking part, whereas then the other locking portion is situated at the opposite floor panel;

the characteristic that the coupling parts on all four edges are realized in one piece from the material of the floor panels;

the characteristic that the female coupling part at the short edge and the female coupling part at the long edge are realized substantially similar to each other and preferably are realized identical to each other;

the characteristic that at the underside of the female coupling part of the long edge and/or short edge a recess is present, which recess facilitates an easy bending during joining.

According to a third aspect, the invention relates to a set of floor panels, wherein these floor panels are oblong rectangular and thus have a pair of long edges and a pair of short edges; wherein the long as well as the short edges are provided with mechanical coupling parts, which allow coupling the floor panels of the set to each other; wherein the one long edge is provided with a male coupling part and the other long edge is provided with a female coupling part; wherein the one short edge is provided with a male coupling part and the other short edge is provided with a female coupling part; wherein the male coupling part at the long edge can be inserted into the female coupling part at the long edge of a floor panel of the set by means of a turning movement; wherein the male coupling part at the long edge can also be inserted into the female coupling part at the short edge of a floor panel of the set by means of a turning movement; and wherein the male coupling part at the short edge can be inserted into the female coupling part at the long edge in one and the same turning movement which is used for inserting the male coupling part at the long edge into the female coupling part at the long or short edge; wherein the male coupling part at the short edge and the female coupling part at the long edge comprise locking parts, generally spoken locking means, which, in a mutually coupled condition of such short edge and long edge, effect a locking in horizontal direction as well as a locking in vertical direction; wherein the female coupling part at the long edge and/or short edge comprises a lateral groove, which is bordered by an upper lip and a lower lip, of which the lower lip extends distally to beyond the upper lip and is provided with an upwardly directed locking part; wherein the male coupling part at the long edge is provided with a tongue, which, in the coupled condition, can cooperate with the aforementioned lateral groove in order to effect a vertical locking; and wherein the set of floor panels preferably comprises at least one pair of locking portions in order to effect the aforementioned vertical locking of the male coupling part of the short edge in the female coupling part at the long edge, namely a first locking portion at this male coupling part, wherein "male coupling part" must be interpreted broadly as being the entire edge profile comprising this male coupling part, and a second locking portion, cooperating therewith in coupled condition, at the female coupling part, with the characteristic that the female coupling part at the long edge and/or short edge at the upwardly directed locking part comprises two locking portions, of which a first locking portion can cooperate with a male coupling part of the short edge of a coupled floor panel, in order to effect at least a horizontal locking, whereas a second locking portion can cooperate with the male coupling part of the long edge of a coupled panel in order to provide at least for a locking in horizontal direction.

A number of possible additional advantages of the fact that for the horizontal locking use is made of the aforementioned two locking portions consists in that a double and thus firm locking can be realized or, alternatively, that both lockings can be optimized independently from each other without production tolerances for the two lockings can have an influence on each other.

According to preferred embodiments, the set of floor panels of the third aspect can show one or more of the following subordinate characteristics, wherein each of these subordinate characteristics can be present separately or in any mutual combination, as far as such combination does not have any contradictory characteristics:

- the characteristic that the respective coupling parts are configured such that the male portion of a short edge can be brought into cooperation with said first locking portion by a, seen in cross-section, downward movement, and that the male portion of a long edge can be brought into cooperation with said second locking portion by a turning movement;
- the characteristic that the first locking portion of the horizontal locking has a locking surface which is upwardly inwardly inclined, wherein this preferably also provides for a vertical locking;
- the characteristic that the second locking portion of the horizontal locking has a locking surface which is upwardly outwardly inclined; the characteristic that any of the following possibilities is applied:
  - at the male part of the short edge as well as at the male part of the long edge, two locking portions are formed, which, in a normal coupled condition, come into cooperation with the aforementioned first as well as the second locking portion, respectively;
  - at the male part of the short edge as well as at the male part of the long edge, two locking portions are formed, of which in a normal coupled condition only one of the two comes into cooperation with the respective first or second locking portion, however, with a tensile load, both come into cooperation with the aforementioned first as well as the second locking portion;
  - at the male part of the short edge as well as at the male part of the long edge each time only one locking portion for realizing the horizontal locking is formed, which then comes into cooperation with the corresponding first or second locking portion;
- the characteristic that the coupling parts on all four edges are realized in one piece from the material of the floor panels;
- the characteristic that the female coupling part at the short edge and the female coupling part at the long edge are realized substantially similar to each other and preferably are realized identical to each other;
- the characteristic that at the underside of the female coupling part of the long edge and/or short edge a recess is present, which recess facilitates an elastic bending during joining; the characteristic that the coupling part at the long edge can also be uncoupled by means of a turning movement out of the female part of the short edge and/or long edge;
- the characteristic that further herein one or more of the characteristics of the first and/or second aspect are applied, wherein all not contradictory combinations are possible.

Further, it also relates to a method for forming a herringbone pattern, with the characteristic that floor panels as mentioned above are applied.

On the one hand, the invention offers the advantage that a floor covering in herringbone pattern can be obtained in a smooth manner. The configuration of the floor panels in fact allows coupling these floor panels by means of a so-called fold-down movement and installing them in herringbone pattern. A floor panel from the set can be coupled at the same time with the long and the short edge to adjacent and already installed floor panels from the set. Preferably, the floor panel then is coupled with the long and short edge to at least the long edges of the adjacent and already installed floor panels in order to obtain a herringbone pattern. On the other hand, in the obtained floor covering the risk of height difference, gap or slit formation between the mutually coupled floor panels is minimized. In fact, a proper locking is not only present between the mutually coupled long edges, but a firm locking can also be provided between the mutually coupled short and long edges.

The inventor has found that the present invention can be applied particularly advantageously with floor panels with a substrate that is realized on the basis of a synthetic material, such as polyvinyl chloride, polyethylene, polypropylene, polyethylene terephthalate and/or polyurethane. In fact, these floor panels have proven to undergo drastic dimensional changes with changing temperature. These changes may lead to the warping of the floor covering and even to the moving apart of the coupled floor panels. The risk of this, however, can be minimized by the present invention due to the firm mutual locking which can be provided between the edges.

The substrate of these floor panels may or may not be multi-layered, however, preferably comprises at least a substrate layer which is realized on the basis of a composition which shows one or more of the following characteristics, as far as they are not contradictory:

- The composition comprises at least a thermoplastic synthetic material.
- The composition comprises at least a synthetic material, such as polyvinyl chloride, polyethylene, polypropylene, polyethylene terephthalate, polyurethane and/or an elastomer.
- The composition comprises one or more plasticizers in an amount of less than 20 phr and preferably in an amount between 5 and 15 phr. In the case that such an amount of plasticizers is applied, this relates to a substrate layer of the rigid or stiff type.
- The composition comprises one or more plasticizers in an amount of at least 20 phr. In this case, this relates to a substrate layer of the supple or flexible type.
- The composition comprises an inorganic filler, such as chalk, talcum and/or lime.
- The composition comprises an organic filler, such as wood particles, bamboo particles and/or cork particles.
- The composition comprises a mineral filler, such as ceramics.
- The composition comprises mineral fiber structures, such as fibers of glass, tall and/or wollastonite.

It is also noted that the presence of a substrate layer of the rigid type, i.e., with an amount of plasticizer of less than 20 phr, is advantageous for the dimensional stability of the floor panels. In conjunction with the firm locking, this rigid substrate layer then provides for an extremely stable floor covering.

Possibly, the substrate layer is foamed. The advantage hereof is that the density of the substrate layer can be reduced. In this manner, an economization of basic materials and energy can be realized. Also, by foaming the substrate layer can also obtain new features, such as in the field of comfort, and, even more important, in the field of dimensional stability.

It is also noted that the substrate layer can be manufactured according to various possibilities. So, the substrate layer can be manufactured by means of strewing, extrusion, injection molding, calendering and/or coating techniques.

The substrate can be composed of a plurality of substrate layers. These substrate layers can be realized on the basis of a composition as described herein above, however, they do not have to be realized identical to each other. The substrate layers can differ, for example, on the basis of the amount of applied plasticizers. Herein, this may relate to the combination of a supple substrate layer with a rigid substrate layer.

In a particularly preferred embodiment, the floor panels are of the so-called Luxury Vinyl Tile (LVT) or Wood Plastic Composite (WPC) type. For example, this relates to floor panels which are realized as described in the document U.S. Pat. No. 9,156,233 B2.

Possibly, the substrate is provided with a reinforcement layer, such as a glass fiber cloth or a glass fleece or a glass net. This reinforcement layer then preferably is incorporated into the substrate. This means that the reinforcement layer then is bordered on the upper side as well as the lower side by the material of the substrate. This reinforcement layer assists in increasing the dimensional stability of the floor panels and thus contributes to avoiding the formation of gaps and cracks in the floor covering in herringbone pattern. It is noted that the substrate can be provided with a plurality of reinforcement layers, whether or not incorporated therein.

The thickness of the floor panels preferably is substantially, thus, for half of it or more, formed by the substrate.

The thickness of the floor panels preferably is situated between 2 and 9 mm and more preferably between 3 and 6 mm. This allows realizing the floor panels sufficiently thin, while they still show sufficient strength and stability.

Preferably, the floor panels are decorative. To this aim, they can be composed of a substrate and a top layer situated above the substrate and comprising a decor. This decor preferably shows a motif or pattern which can simulate, for example, a natural product, such as wood, stone or ceramics. This then relates, for example, a wood motif or pattern. This motif then can simulate, for example, wood nerves or wood pores.

The decor preferably relates to a print which, whether or not directly, is provided on an underlying layer of the floor panel. When the print is not provided directly, it then typically is provided on a carrier sheet. This carrier sheet can be, for example, a synthetic foil, such as a polyvinyl chloride foil, polyurethane foil, polypropylene foil, polyethylene terephthalate foil or polyethylene foil. Preferably, the carrier sheet is connected to the substrate or another layer of the top layer by means of a thermal laminating process. When the print is provided directly on an underlying layer of the floor panel, the so-called direct print, it is not excluded that it is provided on a basic layer or primer provided on the underlying layer. With the direct print, preferably a digital printer, such as an inkjet printer, is applied.

Preferably, the top layer also comprises a transparent or translucent wear layer situated above the decor. This wear layer then forms a protection for the decor. For example, this relates to a synthetics-based wear layer, which either is provided as a foil, whether or not together with the aforementioned printed foil, for example, by means of a thermal laminating process, or is provided in liquid condition and subsequently is cured on the substrate or another layer of the top layer. In the case that the wear layer comprises a foil, this preferably relates to a thermoplastic foil, in particular a polyvinyl chloride foil, a polyurethane foil, a polypropylene foil, a polyethylene terephthalate foil or a polyethylene foil.

The top layer can be finished with a lacquer layer, which is provided as a liquid layer on said wear layer and/or said decor and subsequently is cured. Preferably, this relates to a lacquer layer which can be cured by UV light or excimer radiation, or a layer which can be cured by means of temperature increase. This last-mentioned layer can make use, for example, of blocked isocyanates as cross-linkers. Preferably, a lacquer layer is provided on top of the possible wear layer; however, according to an alternative the lacquer layer may function as a wear layer.

The top layer can also be provided with impressions, whether or not realized in register with the decor. To this aim, a roller can be applied, such as described as such in PCT/IB2015/055826. The impressions provide the floor panels with a relief, such that they can simulate a natural structure, such as a wood structure, even better. The impressions can be realized, for example, according to a wood nerve pattern.

Apart from the substrate and the top layer, the floor panels can also comprise a backing layer situated underneath the substrate. The backing layer can be realized, for example, on the basis of cork or on the basis of a thermoplastic synthetic material, which latter preferably is of the supple type. Such rather soft backing layer can impart new properties to the floor panels, for example, in the field of comfort and sound absorption. In particular, the backing layer forms a layer with acoustic properties. The backing layer can contribute, for example, to the reduction of the sound production of the floor panels, for example, when the latter are walked on.

As becomes clear from the above, the invention primarily aims at floor panels which are composed of a substrate which is realized on the basis of a synthetic material, such as polyvinyl chloride, polyethylene, polypropylene, polyethylene terephthalate and/or polyurethane. However, the invention is not limited to such floor panels. Generally, it can be applied in any kind of floor panel. For example, it is not excluded that the invention is applied with floor panels with a substrate based on wood, such as an MDF or HDF substrate, on which a top layer of any kind can be present, for example, a laminate layer. The invention can also be applied to floor panels with a wood-based substrate and a wooden top layer situated there above, such as a wood veneer top layer. This then relates to floor panels of the so-called engineered wood type.

In summary, the independent aspects of sets of floor panels of the invention are not limited to certain types or materials of floor panels but can be applied in a variety of floor panels.

That the set of floor panels is suitable for forming a floor covering in herringbone pattern implicitly implies that this set consists of at least two types of floor panels. Herein, the coupling parts of the one type of floor panels on one pair of edges are mirrored in respect to the coupling parts of the other type of floor panels at the same pair. More accurately, it is the location of the coupling parts which is mirrored.

The present invention also relates to a method for installing the set of floor panels. This set consists of at least two types of floor panels, wherein the coupling parts of the one type of floor panels on one pair of edges are mirrored in respect to the coupling parts of the other type of floor panels at that same pair. The method comprises at least the following steps:

forming a first row by coupling floor panels of the first type to floor panels of the second type, short edge against long edge; and forming at least a second row at the first row by coupling floor panels of the one type to floor panels of the other type, short edge against long edge, wherein the floor panels from the second row are installed by means of a single turning movement.

Applying this method offers a particularly smooth installation of the floor covering in herringbone pattern. The floor panels of the second row and possible following rows in fact can all be installed by only making use of the user-friendly turning movement, to which in the technical field reference is also made by the term fold-down movement. Moreover, the specific configuration of the floor panels provides for that in the resulting floor covering the risk of the occurrence of height difference, gaps or cracks in mutual respect is small or at least can be minimized.

In a practical embodiment, the aforementioned second row is formed by inserting the male coupling part at the short edge of a first coupling panel into the female coupling part at the long edge of a second floor panel, in one and the same turning movement that is used for inserting the male coupling part at the long edge of the first floor panel into the female coupling part at the long or short edge of a third floor panel. Possible further rows can also be installed or laid in this manner.

The coupling parts at the long sides of both types of floor panels preferably are realized in the form of a tongue and a groove, wherein the groove is bordered by an upper lip and a lower lip. The lower lip can project beyond the upper lip. The tongue and groove preferably are provided with locking portions, which, in coupled condition, counteract the moving apart of the tongue and groove in horizontal direction. Such coupling parts are known as such from document WO 97/47834.

The coupling parts at the short sides of both types of floor panels are preferably realized as a downwardly directed upper hook-shaped portion and an upwardly directed lower hook-shaped portion. The upper hook-shaped portion comprises a lip with a downwardly directed locking portion and the lower hook-shaped portion a lip with an upwardly directed locking portion. In coupled condition, these locking portions counteract the moving apart of the hook-shaped portions in horizontal direction.

It is noted that by "mechanical coupling parts" coupling parts are understood which allow realizing a mechanical locking. Thus, no glue or the like is necessary for the locking. However, the use of glue is not excluded.

BRIEF DESCRIPTION OF THE DRAWINGS

With the intention of better showing the characteristics of the invention, herein below, by way of example without any limitative character, some preferred embodiments are described, with reference to the accompanying drawings, wherein.

DETAILED DESCRIPTION OF VARIOUS EMBODIMENTS

Figure 1:
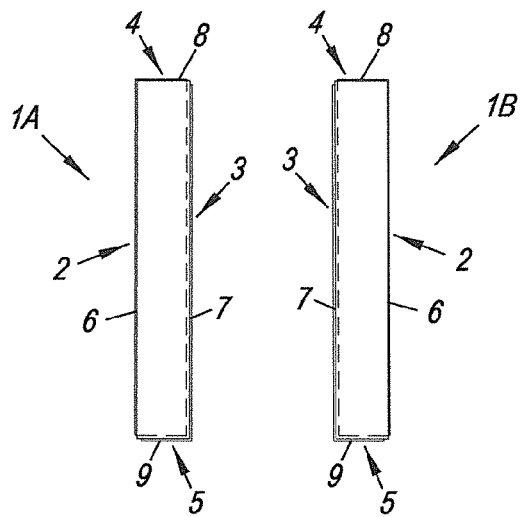
FIG. 1 represents in top view two floor panels from a set according to the invention.

FIG. 1 represents in top view two floor panels 1 from a set of floor panels according to the invention, which are different from each other and therefore are indicated more specifically by 1A and 1B. These floor panels 1A-1B are suitable for forming a floor covering in herringbone pattern, as will become clear from the following.

Figure 2:
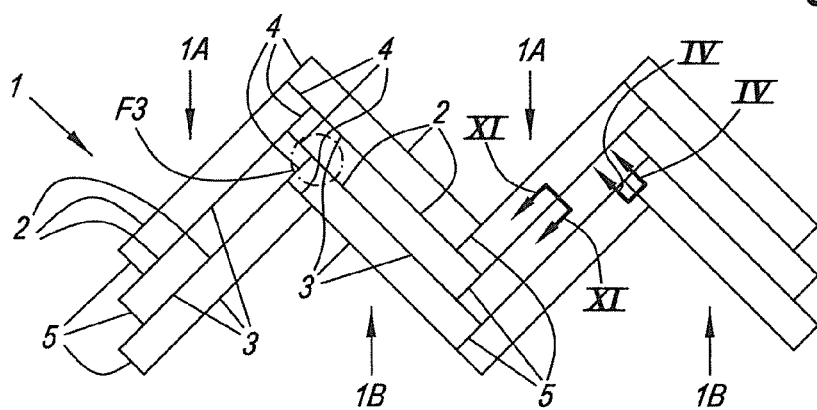
FIG. 2 schematically represents a partially realized floor covering, with floor panels of FIG. 1, which are installed in herringbone pattern.

In FIG. 2, a part of the floor covering in herringbone pattern is represented. In this floor covering, a plurality of the floor panels 1A-1B are used.

The floor panels 1A-1B are oblong rectangular and thus have a pair of long edges 2-3 and a pair of short edges 4-5. The long as well as the short edges 2-3-4-5 are provided with mechanical coupling parts 6-7-8-9, which allow coupling a plurality of such floor panels 1A-1B to each other. The one long edge 2 is provided with a male coupling part 6 and the other long edge 3 is provided with a female coupling part 7. The one short edge 4 is provided with a male coupling part 8 and the other short edge 5 is provided with a female coupling part 9.

From FIG. 1, it is evident that the floor panel 1A is of another type than the floor panel 1B. Namely, the location of the coupling parts 6-7-8-9 in the floor panel 1A is mirrored in respect to the location of the coupling parts 6-7-8-9 in the floor panel 1B.

Figure 3:
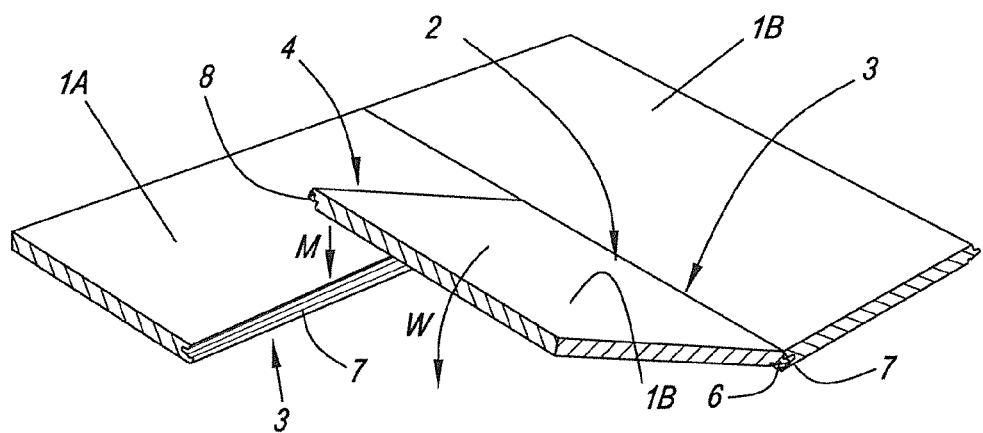
FIG. 3, schematically and at a larger scale, represents the part indicated by F3 in FIG. 2, however, during the joining of the floor panels.

FIG. 3 represents how the floor panels 1A and 1B can be joined systematically in herringbone pattern. In FIG. 3, the intention is that the floor panel 1B represented in upwardly turned condition is connected to the lying floor panels 1A and 1B. Herein, the floor panel 1B, which is in turned-up condition, is presented to the edge 2 with the male coupling part 6 at the edge 3 of the lying-down floor panel 1B, after which these floor panels 1B at the edges 2 and 3 are turned into each other by means of the turning movement W. As a result of the turning movement W, a downward movement M is created at the short edge 4, which, according to the invention, results in that a male coupling part 8, which is situated at the short edge 4, is lockingly coupled to the female coupling part 7 of the long edge 3 of the transverse-directed floor panel 1A.

How the mechanical coupling parts 6-7-8-9, for example, may look like, can be seen, for different embodiments, in FIGS. 4 to 16 and 18 to 21, as well as from the description delivered by the appended claims, and there, where necessary, from the information offered by WO 2017/187298 A2, which is considered incorporated.

Figure 4:
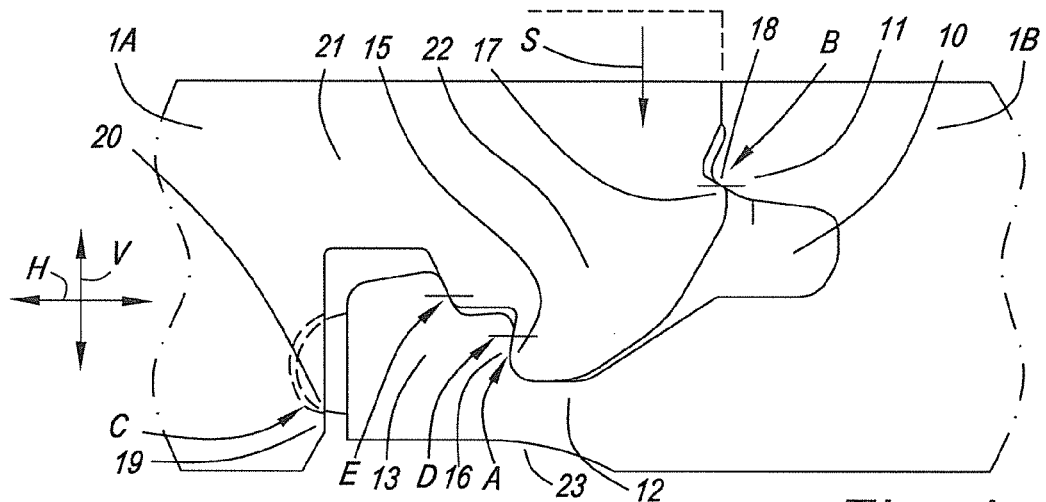
FIGS. 4, 5 and 6, for three practical variants and each time at a larger scale, represent a cross-section according to line IV-IV in FIG. 2.
Figure 5:
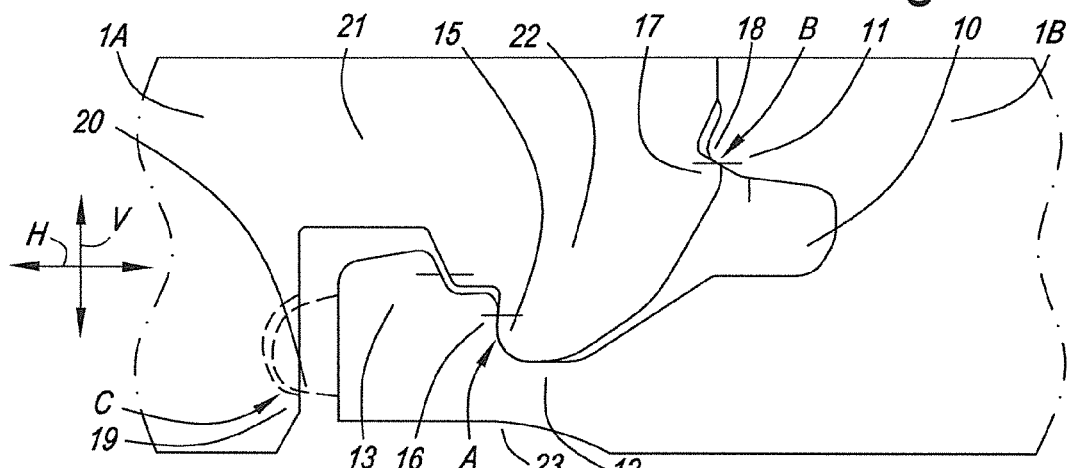
Figure 6:
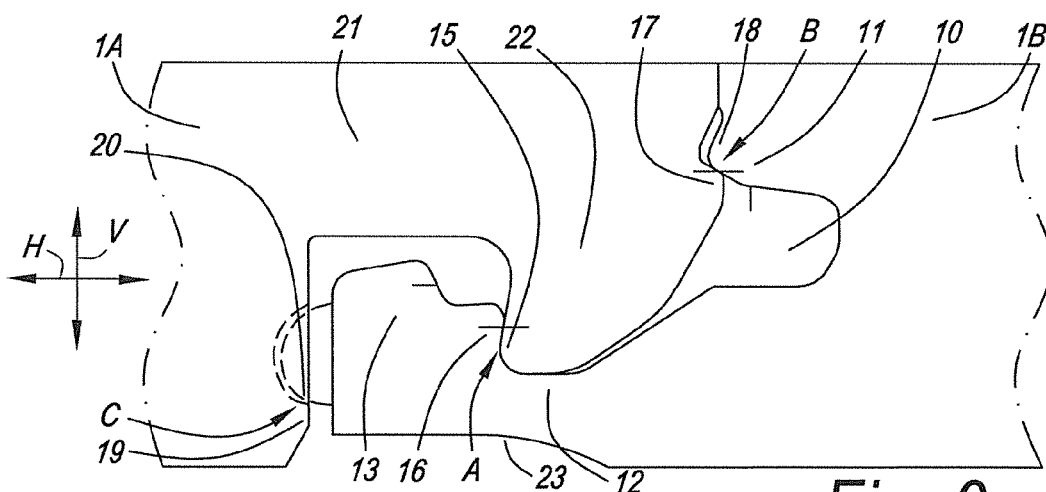

Summarized, it can be stated that, as indicated, amongst others, in FIGS. 4, 5 and 6, the first, second and third aspect of the invention relate to the following:

The first aspect of the invention relates to the fact that at least at location A a vertical locking is present. Alternatively, additionally thereto vertically active locking portions can also be provided at locations B and/or C.

The second aspect of the invention relates to the fact that at least at location C there is a vertical locking. Alternatively, additionally thereto vertically active locking portions can also be provided at locations A and/or B.

The third aspect of the invention relates to the fact that at least at two locations D and E (whereby D can be the same as A) horizontally-locking locking portions are present in respect to this third aspect.

Herein below, this is explained more detailed referring to the reference numerals on the drawings.

According to each of the aforementioned three aspects, this relates to a set of floor panels, wherein these floor panels 1A-1B are oblong rectangular and thus have a pair of long edges 2-3 and a pair of short edges 4-5; wherein the long as well as the short edges are provided with mechanical coupling parts 6-7-8-9, which allow coupling the floor panels of the set to each other; wherein the one long edge 2 is provided with a male coupling part 6 and the other long edge 3 is provided with a female coupling part 7; wherein the one short edge 4 is provided with a male coupling part 8 and the other short edge 5 is provided with a female coupling part 9; wherein the male coupling part 6 at the long edge 2 can be inserted into the female coupling part 7 at the long edge 3 of a floor panel of the set by means of a turning movement W; wherein the male coupling part 6 at the long edge 2 can also be inserted into the female coupling part 9 at the short edge 5 of a floor panel of the set by means of a turning movement W; and wherein the male coupling part 8 at the short edge 4 can be inserted into the female coupling part 7 at the long edge 3 in one and the same turning movement W which is used for inserting the male coupling part 6 at the long edge 2 into the female coupling part 7 or 9 at the long or short edge 3 or 5; wherein the male coupling part 8 at the short edge 4 and the female coupling part 7 at the long edge 3 comprise locking parts, in other words, locking means, which, in a mutually coupled condition of such short edge and long edge, effect a locking in horizontal direction H as well as a locking in vertical direction V; wherein the female coupling part 7 at the long edge 3 and/or short edge comprises a lateral groove 10, which is bordered by an upper lip 11 and a lower lip 12, of which the lower lip 12 extends distally to beyond the upper lip 11 and is provided with an upwardly directed locking part 13; wherein the male coupling part 6 at the long edge 3 is provided with a tongue 14, which, in the coupled condition, can cooperate with the aforementioned lateral groove 10 in order to effect a vertical locking; and wherein the set of floor panels 1A-1B comprises at least one pair of locking portions 15-16 and/or 19-20 in order to effect the aforementioned vertical locking of the male coupling part 9 of the short edge in the female coupling part 7 at the long edge, namely a first locking portion 15-17-19 at this male coupling part and a second locking portion 16-18-20, cooperating therewith in coupled condition, at the female coupling part.

In the examples of FIGS. 4 to 6, a plurality of locking portions are represented, which provide or can provide for the aforementioned vertical locking, which pairs of locking portions, in this case thus 15-16, 17-18, 19-20, are situated at the indicated and herein below defined locations A, B and C, respectively.

The vertical locking in location A thus is obtained by the cooperation of a first locking portion 15 at the male coupling part 8 and a second locking portion 16 at the female coupling part. By definition, by locking portions situated at the location A is meant that the second locking portion 16 is situated at the proximal side of the aforementioned upwardly directed locking part 13, whereas the first locking portion 15 is provided at a corresponding position at the male coupling part 8.

It is noted that the male coupling part 8 at the short edge comprises a flange 21 extending laterally at the top, at which a downwardly extending locking part 22 is situated. By the herein above-mentioned locking portions 17-18 at the location B by definition is meant that one locking portion 17 is situated at the distal end of the aforementioned flange 21 and/or of the downwardly extending locking part 22, whereas then the other, thus second, locking portion 18 is situated at a corresponding position at the opposite floor panel.

By definition, by locking portions 19-20 which are situated at the location C is meant that the second locking portion 20, which is present at the female coupling part, is situated at the distal end of the lower lip 12 and/or of the upwardly directed locking part 13, whereas then the first locking portion 19 is provided at a corresponding position at the male coupling part. In respect to the location C it is clear that by the "male coupling part" the entire edge profile has to be understood which belongs to this coupling part, as well as by the "female coupling part" the entire edge profile has to be understood which belongs to this coupling part. The locking portions 19 and 20 as such belong to the respective coupling parts.

It is noted that, although in FIGS. 4 to 6 vertically active locking portions are depicted on all three locations A, B and C, this, according to the invention, does not necessarily have to be the case. However, it is so that in order to fulfill the first aspect of the invention, the requirement must be fulfilled that a vertical locking exists at least at the location A, which location is as defined herein above. Subordinate thereto vertically active locking portions can also be provided on location B and/or location C.

The following further preferred subordinate characteristics of the first aspect, which, as far as they are not contradictory to each other, can be combined at choice, are also visualized in the figures:

the aforementioned second locking portion 16 consists of an undercut or, in other words, a portion forming an undercut, preferably in the form of an inclined surface, under which the first locking portion 15 can engage;

the respective coupling parts are configured such that the aforementioned first locking portion 15 can be brought behind the second locking portion 16 by means of a downward movement of the respective coupling part, more particularly by means of a downward snap movement S; possible additional locking portions 17-18 and/or 19-20 at the locations B and/or C in such case then shall also be configured such that they allow such downward snap movement, which in fact is the case in the represented figures;

in the case of an additional locking at the location C, the locking portion 20, which is situated at the distal end of the aforementioned lower lip 12 and/or the upwardly directed locking part 13, consists of a protrusion or recess, whereas the locking portion cooperating therewith then consists of a recess or protrusion, respectively, wherein such protrusion can consist, for example, of a bulge-shaped portion; in FIGS. 4-5-6, by way of example, such bulge-shaped portion is provided on the distal end of the lip 12;

the coupling parts on all four edges 2-3-4-5 are realized in one piece from the material of the floor panels, thus without making use of separate locking strips or the like;

the female coupling part 9 at the short edge and the female coupling part 7 at the long edge are realized substantially similar to each other and preferably are realized identical to each other;

at the underside of the female coupling part of the long edge and/or short edge a recess 23 is present, which recess facilitates an elastic bending during joining, such in order to provide in a snap effect during joining and/or to provide in joined condition, by means of an elastic bending, in a permanent pull-back force or pretension.

In order to fulfill the second aspect of the invention, it is required that at least on location C vertically active locking portions, thus, 19-20, are present. Subordinate thereto also on location A and/or location B vertically active locking portions 15-16, 17-18, respectively, can be provided.

The following further preferred subordinate characteristics of the second aspect, which, as far as they are not contradictory to each other, can be combined at choice, are also visualized in the figures:

in the case of an additional locking in location A, the aforementioned second locking portion 16 of the locking portions 15-16 consists of an undercut, preferably in the form of an inclined surface under which the first locking portion 15 can engage; for clearness' sake, the inclination of the undercut and of the locking portion cooperating therewith, at least of the pertaining locking surfaces, is indicated by a dash-dotted line with reference H (not to be confused with the horizontal direction which also is indicated by H);

the respective coupling parts are configured such that they can be joined together by means of a downward snap movement S;

the locking portion 20, which is situated at the distal end of the aforementioned lower lip 12 and/or the upwardly directed locking part 13, consists of a protrusion or recess, whereas the cooperating therewith locking portion then consists of a recess or protrusion, respectively, wherein such protrusion can consist, for example, of a bulge-shaped portion; as aforementioned, in FIGS. 4-5-6, by way of example such bulge-shaped portion is represented at the distal end of the lip, in dashed line;

the coupling parts on all four edges 2-3-4-5 are realized in one piece from the material of the floor panels, thus without making use of separate locking strips or the like;

the female coupling part at the short edge and the female coupling part at the long edge are realized substantially similar to each other and preferably are realized identical to each other;

at the underside of the female coupling part of the long edge and/or short edge a recess 23 is present, as aforementioned, which recess facilitates an elastic bending during joining, such in order to provide in a snap effect during joining and/or to provide in joined condition, by means of an elastic bending, in a permanent pull-back force or pretension.

Figure 7:
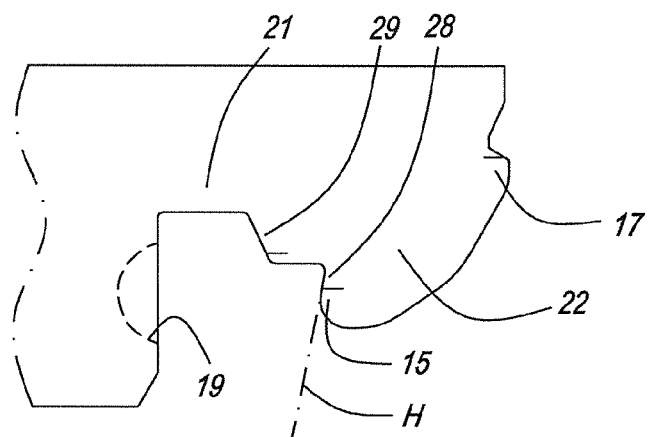
FIGS. 7, 8 and 9 each represent the male coupling part as such from FIGS. 4, 5 and 6, respectively.
Figure 8:
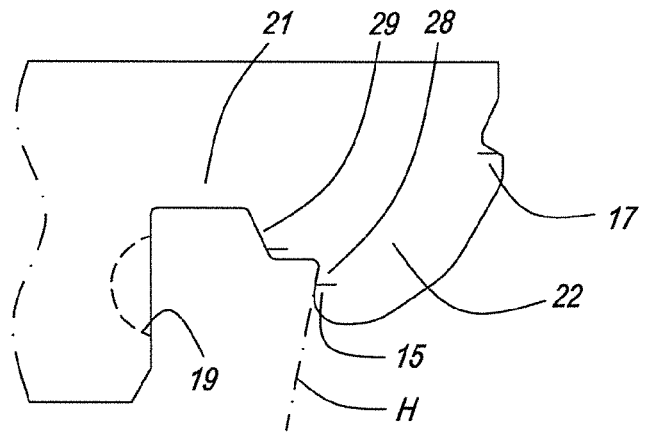
Figure 9:
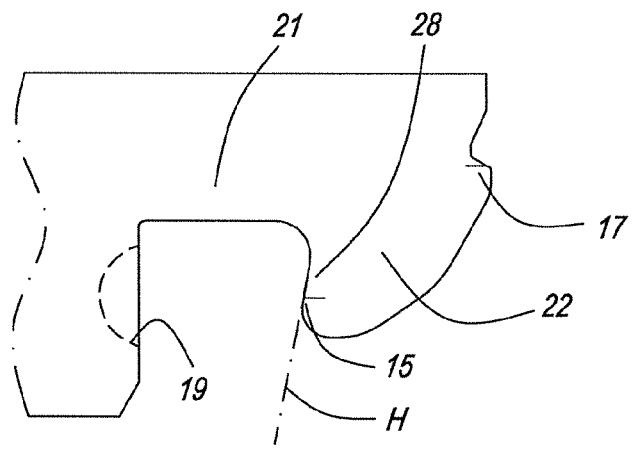
Figure 10:
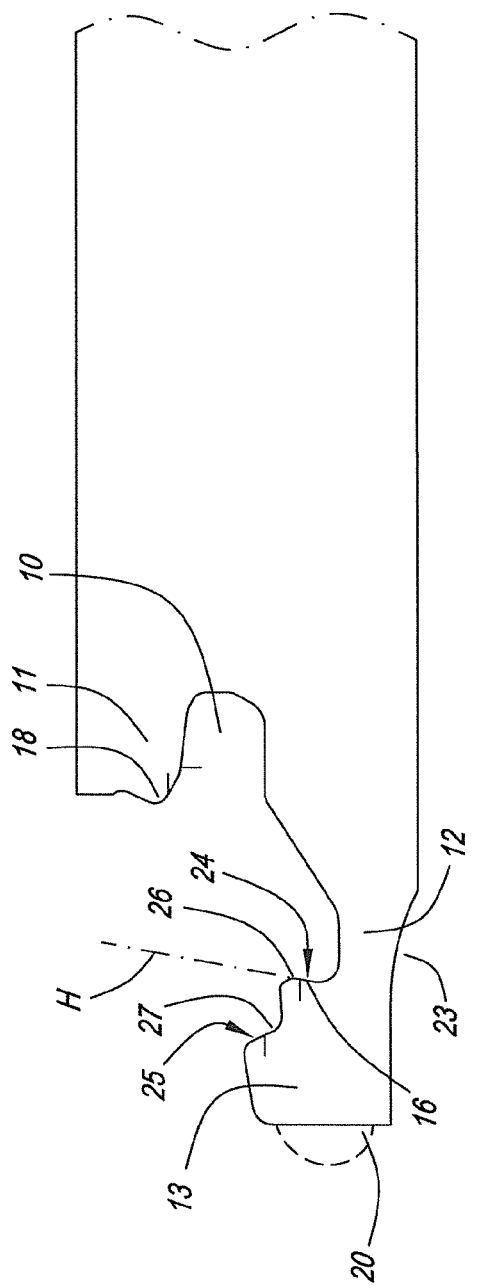
FIG. 10 represents the female coupling part from FIGS. 4, 5 and 6 as such.
Figure 11:
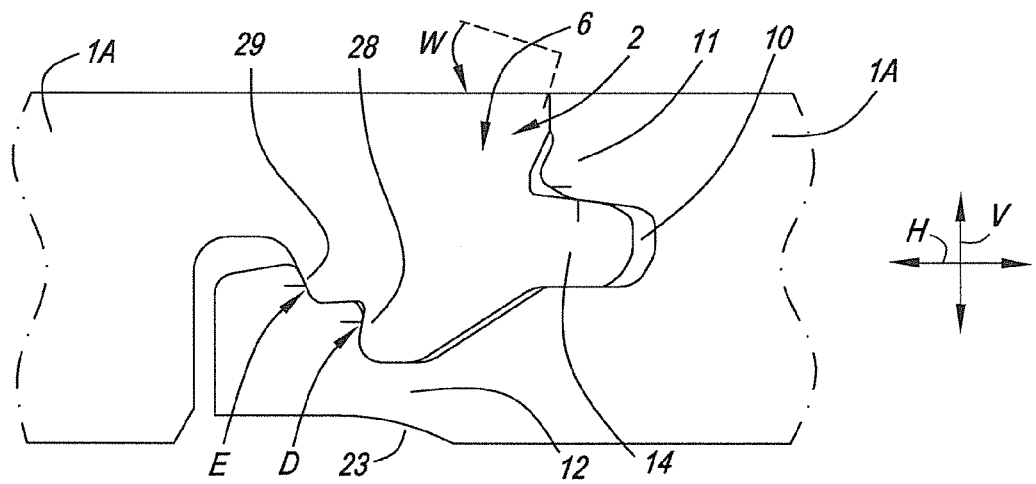
FIGS. 11, 12 and 13, for three practical variants and each time at a larger scale, represent a cross-section according to line XI-XI in FIG. 2, wherein in these embodiments the female coupling part each time is the same as in FIG. 10.
Figure 12:
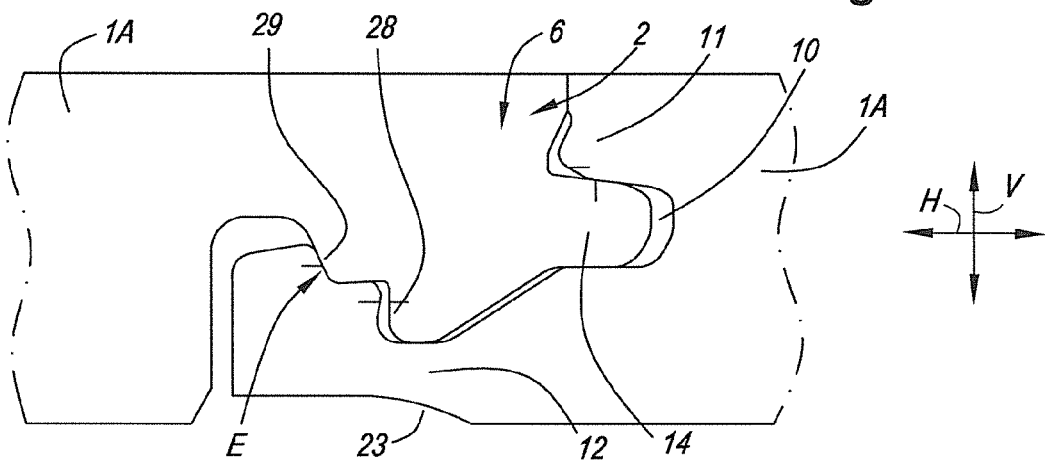
Figure 13:
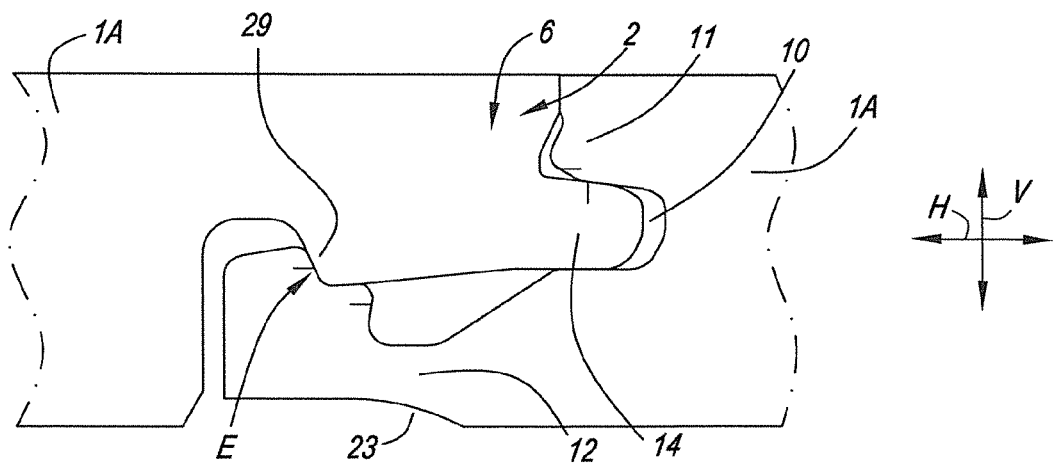
Figure 14:
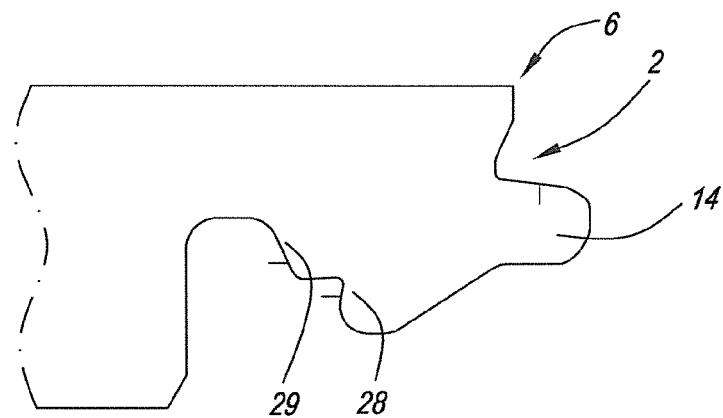
FIGS. 14, 15 and 16 each time represent the male coupling part as such, from FIGS. 11, 12 and 13, respectively.
Figure 15:
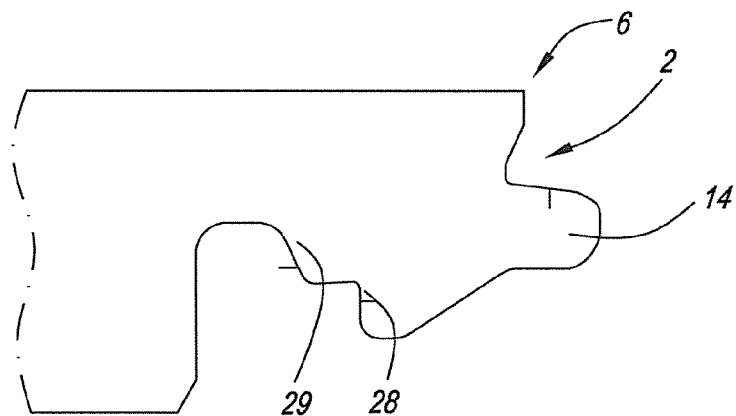
Figure 16:
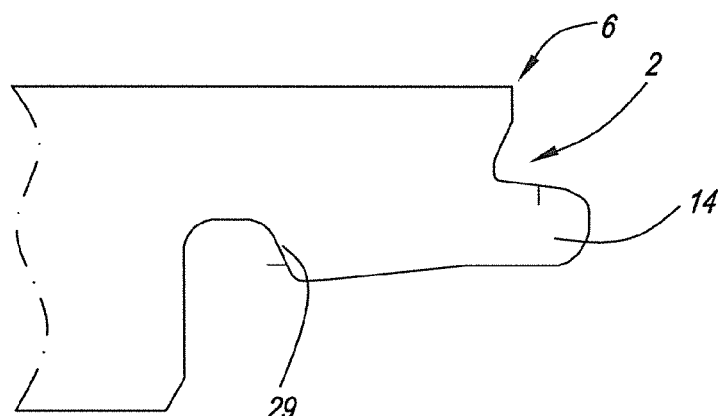

The specific characteristics of the third aspect of the invention are visualized in the preferred embodiments of FIGS. 4 to 6 and 10 to 13. According to the third aspect, the female coupling part at the long edge and/or short edge, of which as an example in the FIGS. 4 to 6 as well as 10 to 13 the female coupling part of the long edge is represented, comprises two locking portions at the upwardly directed locking part 13, of which a first locking portion 24 can cooperate at least with a male coupling part of the short edge of a coupled floor panel in order to effect at least a horizontal locking, whereas a second locking portion 25 can cooperate at least with the male coupling part 6 of the long edge of a coupled floor panel in order to provide herein, too, at least a locking in horizontal direction. Examples of the intended locking portions 24 and 25 are specifically indicated in FIG. 10 and comprise locking surfaces 26 and 27. According to this third aspect, the first locking portion 24, via the locking surface 26, thus can cooperate at least with a locking portion 28 at a male coupling part of a short edge, for example, as represented in FIGS. 4 to 9. As indicated in FIGS. 7 to 9, the locking portion 28 of the third aspect herein is the same as the previously mentioned locking portion 15. Moreover, according to the third aspect, as aforementioned, it is also required that the second locking portion 25, in this case via a locking surface 27, can cooperate at least with a locking portion 29 at the male part of a long edge, which as such is illustrated in FIGS. 11 to 13.

The following further preferred subordinate characteristics of the third aspect, which, as far as they are not contradictory to each other, can be combined at choice, are also visualized in the figures:

- as indicated in the example of FIG. 10, the first locking portion 24 comprises a locking surface 26, which is upwardly inwardly inclined, wherein this preferably also provides for a vertical locking; it is noted that the first locking portion 24 of the pair of locking portions 24-25 in this case preferably is the same as the already mentioned locking portion 16, and the inclined locking surface 26 then thus is formed by the already mentioned undercut;
- the second locking portion 25 of the pair of locking portions 24-25 comprises a locking surface 27 which is upwardly outwardly inclined, such as also clearly visible in, amongst others, FIG. 10;
- preferably, one of the following three possibilities is provided:
  - at the male part of the short edge as well as at the male part of the long edge, two locking portions are formed which, in a normal coupled condition, come into cooperation with the aforementioned first locking portion 24 as well as with the second locking portion 25, respectively, such as, for example, in the case of floor panels in which the profiles of FIGS. 4 and 11 occur combined;
  - at the male part of the short edge and/or at the male part of the long edge, two locking portions are formed, of which, in a normal coupled condition, only one of the two comes into cooperation with the respective first locking portion 24 or second locking portion 25, respectively, however, with a tensile load both come into cooperation with the aforementioned first as well as with the second locking portion, such as, for example, in FIGS. 5 and 12;
  - at the male part of the short edge as well as at the male part of the long edge each time only one locking portion for realizing the horizontal locking is formed, which then comes into cooperation with the corresponding first locking portion 24 or second locking portion 25, such as, for example, in the case of floor panels in which the profiles of FIGS. 6 and 13 occur combined;
- the coupling parts on all four edges are realized in one piece from the material of the floor panels;
- the female coupling part at the short edge and the female coupling part at the long edge are realized substantially similar to each other and preferably identical to each other;
- at the underside of the female part of the long edge and/or short edge, a recess 23 is present, which recess facilitates an elastic bending during joining.

Figure 17:
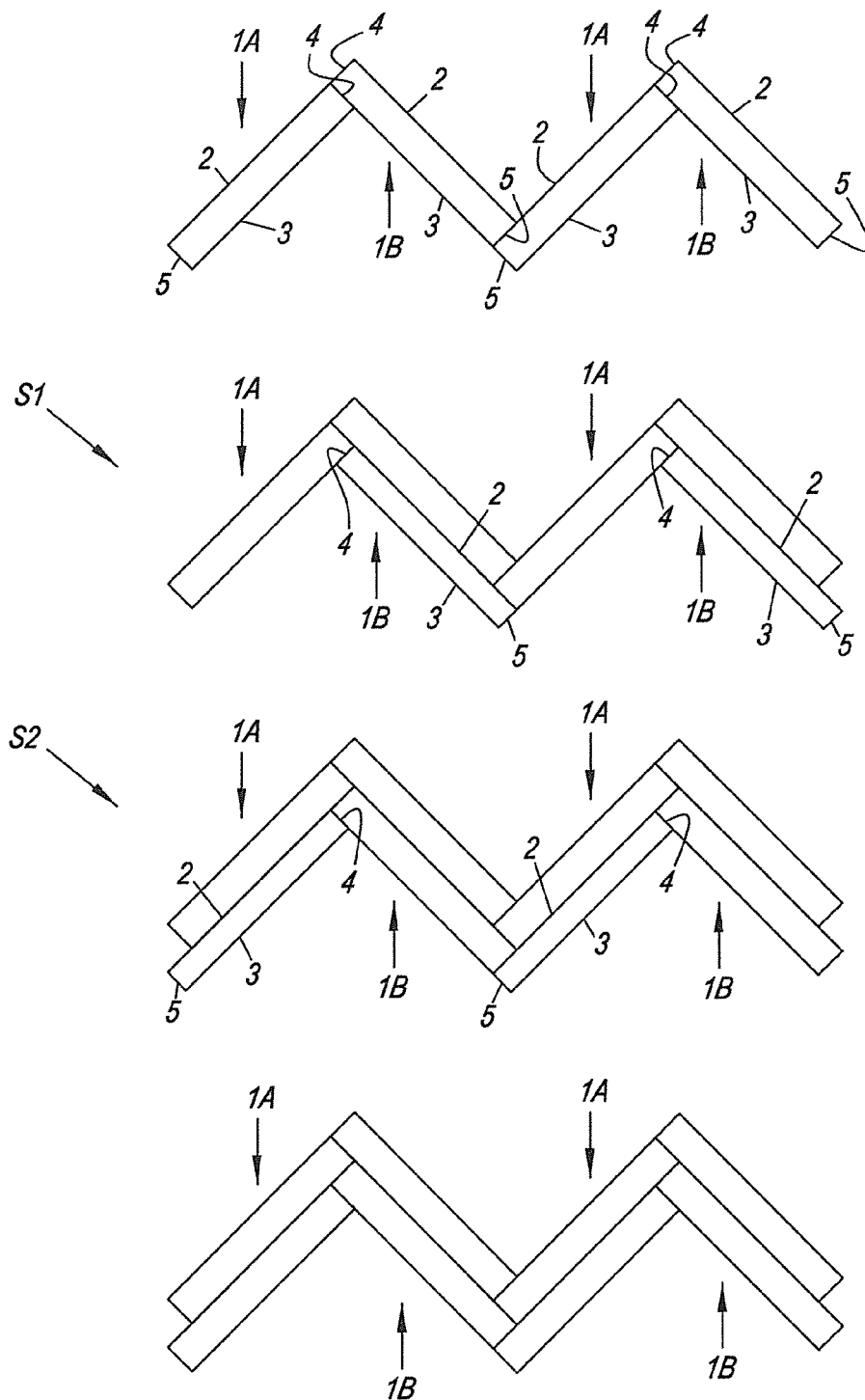
FIG. 17 schematically represents an example how such floor panels can be installed in a herringbone pattern.

In FIG. 17 is represented schematically how the floor panels can be installed in herringbone pattern. The upper part of the figure shows that first one row is coupled in zigzag. In step S1 then two floor panels in upward-turned condition are presented to the first row. Step S2 shows that the floor panels added in S1 have been turned down and now the two following floor panels in upward-turned condition are presented to the first row. By turning these down, too, the condition is obtained which is depicted in the lower part of FIG. 17.

Figure 18:
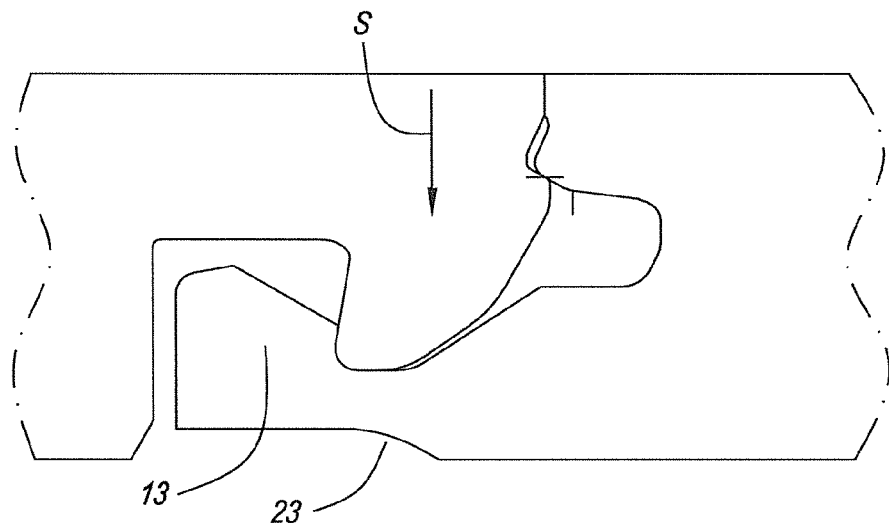
FIGS. 18 and 19 represent cross-sections of the coupling parts of another embodiment of the invention.
Figure 19:
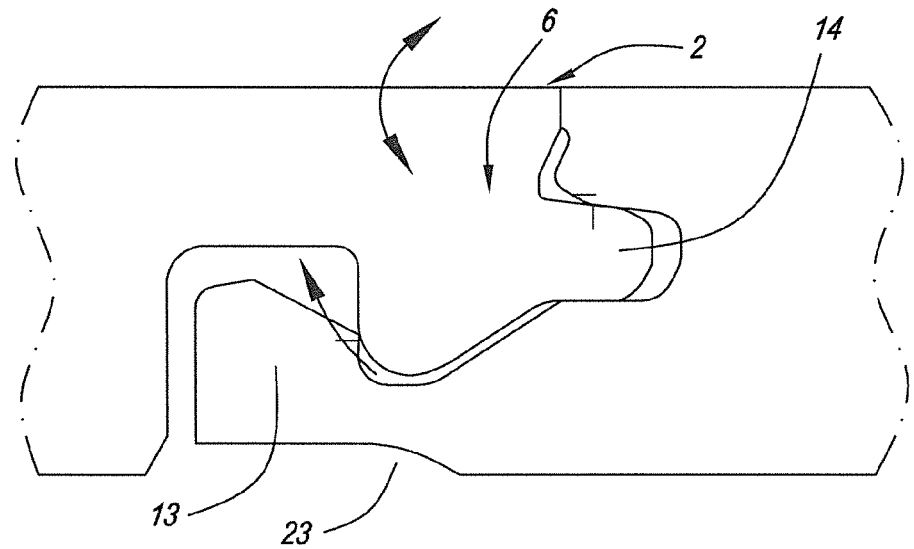

FIGS. 18 and 19 schematically represent a variant in which FIG. 18 is a variant of FIG. 6 and FIG. 19 is a variant of FIG. 13.

Figure 20:
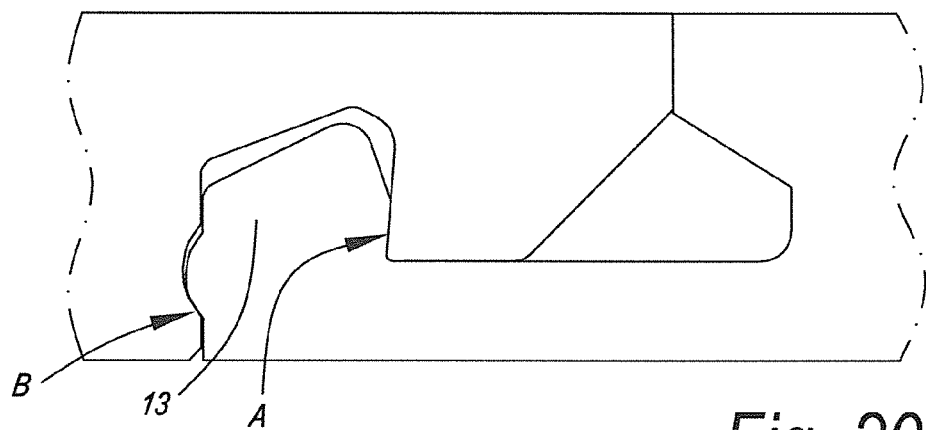
FIGS. 20 and 21 represent cross-sections of the coupling parts of still another embodiment of the invention.
Figure 21:
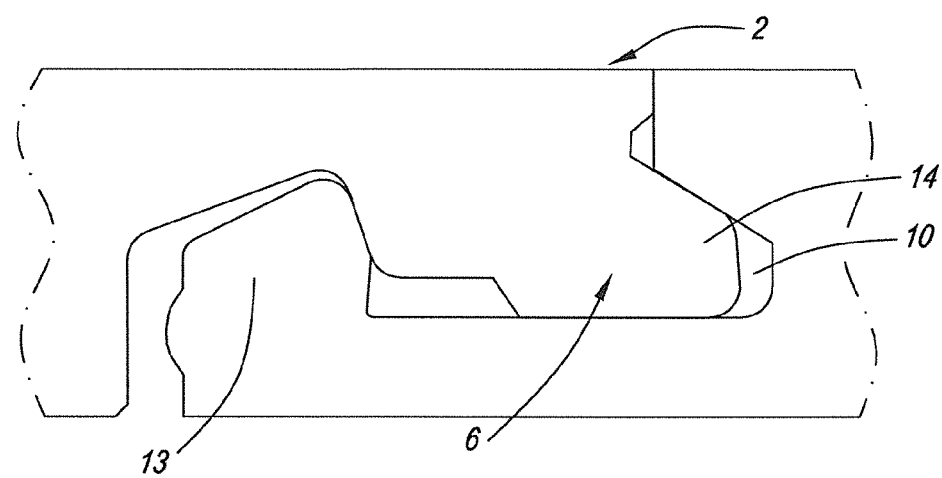

FIGS. 20 and 21 represent another variant hereof.

Figure 22:
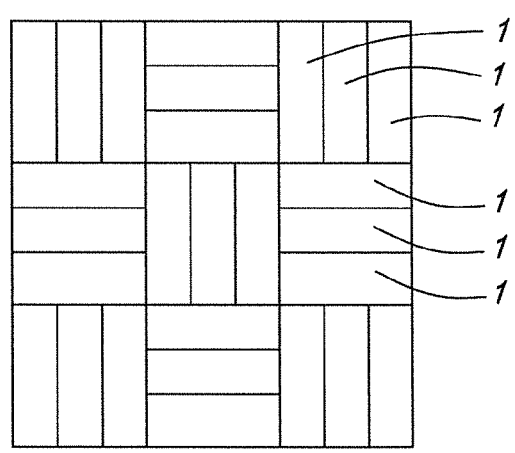
FIG. 22 represents a laying motif in which the invention can also be applied, wherein one type of floor panels may suffice, in other words, wherein a set of the invention then not necessarily still has to comprise two types of floor panels.

FIG. 22 illustrates that such floor panels can also be installed in a block pattern.

Figure 23:
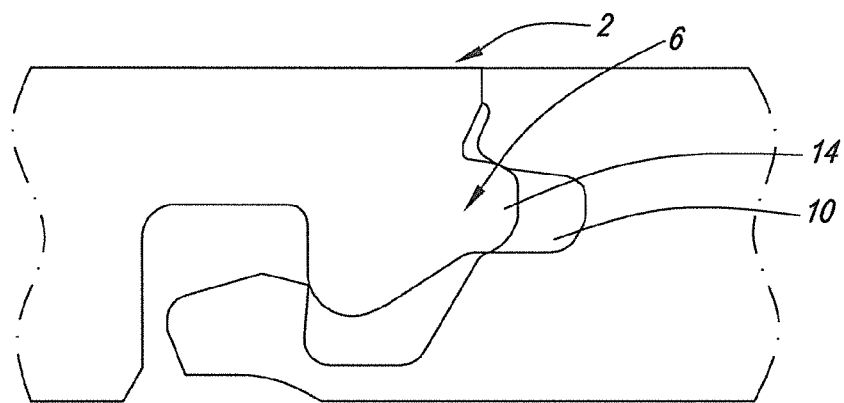
FIGS. 23 to 25 represent another particular variant of the invention.
Figure 24:
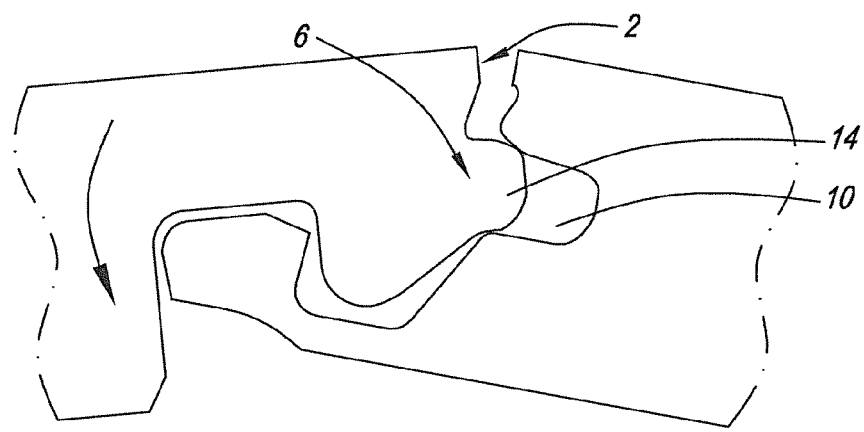
Figure 25:
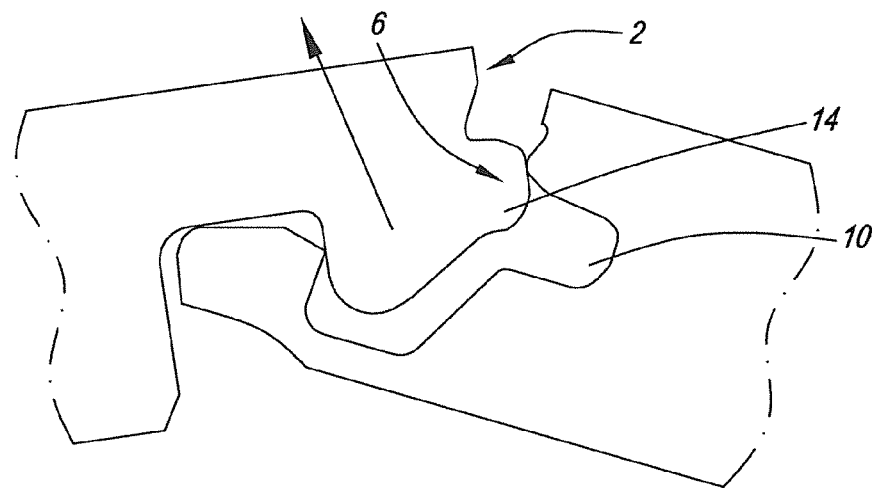

FIGS. 23 to 25 illustrate a particular embodiment, wherein the aforementioned tongue 14 and groove 10 can be separated from each other by a backward turning movement and thus have a configuration at the respective coupling parts which allows this. This can be useful when certain floor panels have to be uncoupled, for example, when during installation a floor panel temporarily has to be uncoupled. It is clear that with the rearward movement the already installed floor panels have to be lifted somewhat, for example, by putting the hand thereunder.

In the embodiment of FIGS. 23 to 25, the configuration allows separating the floor panels at the represented edges completely from each other, such as depicted in FIG. 25. Alternatively, the configuration can also be such that a complete separation at the long edges is not possible by the rearward turning but that this turning in fact is large enough that an unlocking at the short edge of the floor panel or of a coupled floor panel turning along is enabled.

It is also noted that the coupling parts 6-7 can be configured such that they, in the coupled condition, provide for a tension force which presses the coupled edges 2-3 at their upper sides towards each other. For this purpose, the principle of FIG. 23 of document WO 97/47834 can be applied. The lower lip 25 then can be, for example, in the coupled condition permanently bent downward somewhat.

In the example, the female coupling part 9 at the short edge 5 is made identical to the female coupling part 7 at the long edge 3. Thus, it then also is not explicitly shown. However, it is clear that this female coupling part 9 does not necessarily have to have the same shape as the female coupling part of the long edges but that it suffices that the stated functionalities are present in order to realize the respective aspects of the invention.

It is clear that the lower lip 12, where it is necessary, shall be sufficiently flexible to allow, during the turning in and/or out, a locking, unlocking, respectively. In certain embodiments it can also provide for that the tongue 14 can be snapped horizontally into the groove 10, which, for example, is the case in FIG. 13.

It is noted that when reference is made to the "upwardly directed locking part of the lower lip", this can relate to a locking part which effectively protrudes above the average level of the upper side of the lip, as well as to a locking part which is situated partially or even entirely below this level, however, which proximally thereof has a recess in the upper side of the lower lip. As in this last case, a recess for the locking part is situated, the adjacent locking part automatically is also "upwardly directed".

It is noted that the short transversal lines, which are present in the figures of the cross-sections of the floor panels, are of no substantial importance for the invention. They only indicate the locations of the centers of the contact zones where the profiles mutually cooperate in coupled condition.

It is clear that by "locking portions" portions are understood which can engage behind each other and then offer a certain resistance against unlocking in horizontal or vertical direction, which, of course, does not exclude that an unlocking is no longer possible when a certain unlocking force is overcome.

It is also clear that the term "locking portion" can relate to the material portion or the zone offering the respective locking, as well as to the locking surface thereof which effects the locking.

The present invention is in no way limited to the herein above-described embodiments, on the contrary may such methods and floor panels be realized according to various variants, without leaving the scope of the present invention.

The invention claimed is:

1. A set of floor panels, wherein each floor panel of the set of floor panels is oblong rectangular and has a pair of long edges and a pair of short edges;

wherein the long edges and the short edges are provided with mechanical coupling parts arranged for coupling the floor panels of the set to each other;

wherein a first long edge of the long edges is provided with a male coupling part and a second long edge of the long edges is provided with a female coupling part;

wherein a first short edge of the short edges is provided with a male coupling part and a second short edge of the short edges is provided with a female coupling part;

wherein the male coupling part at the long edge is arranged to be inserted into the female coupling part at the long edge of a floor panel of the set by means of a turning movement;

wherein the male coupling part at the long edge is arranged to be inserted into the female coupling part at the short edge of a floor panel of the set by means of a turning movement; and wherein the male coupling part at the short edge is arranged to be inserted into the female coupling part at the long edge in one and the turning movement arranged for inserting the male coupling part at the long edge into the female coupling part at the long edge or short edge;

wherein the male coupling part at the short edge and the female coupling part at the long edge comprise locking parts arranged to, in a mutually coupled condition, effect a locking in horizontal direction and a locking in vertical direction;

wherein the female coupling part at the long edge and at the short edge comprises a lateral groove bordered by an upper lip and a lower lip, the lower lip extending distally to beyond the upper lip and is provided with an upwardly directed locking part;

wherein the male coupling part at the long edge is provided with a tongue and is arranged to cooperate with the lateral groove in order to effect a vertical locking;

wherein a proximal end of the upwardly directed locking part comprises an inclined face;

wherein a bottom of the tongue comprises a recess, wherein the recess comprises an inclined face;

wherein in a mutually coupled condition of the male coupling part of the long edge of a floor panel coupled with the female coupling part of the long edge of a floor panel an inclined face of the recess of the tongue of the male coupling part of the long edge contacts an inclined face of the upwardly directed locking part of the female coupling part of the long edge to define an inclined contact plane;

wherein the inclined contact plane observed for the coupled female coupling part of the long edge is directed, as seen from a bottom of the coupled panels, in the distal direction of the coupled female coupling part of the long edge;

wherein the set of floor panels comprises at least one pair of locking portions to effect the vertical locking of the male coupling part of the short edge in the female coupling part at the long edge, a first locking portion at the male coupling part and a second locking portion, cooperating therewith in coupled condition, at the female coupling part, wherein the second locking portion present at the female coupling part, is situated at the distal end of the lower lip or of the upwardly directed locking part, whereas the first locking portion is situated at the opposite floor panel.

2. The set of floor panels according to claim 1, wherein the male coupling part at the short edge comprises a flange extending laterally at a top, a downwardly extending locking part is situated at the flange.

3. The set of floor panels according to claim 1, wherein the male coupling part at the short edge comprises a flange extending laterally at a top, a downwardly extending locking part is situated at the flange, wherein the set of floor panels comprises at least a second pair of locking portions in order to effect the vertical locking of the male coupling part of the short edge in the female coupling part at the long edge, namely a third locking portion situated at the distal end of the flange or of the downwardly extending locking part, whereas a fourth locking portion is situated at the opposite floor panel.

4. The set of floor panels according to claim 1, wherein the respective coupling parts are configured such that the first locking portion is arranged to be brought behind the second locking portion by means of a downward movement of the respective coupling part, by means of a downward snap movement.

5. The set of floor panels according to claim 1, wherein the second locking portion forms a protrusion, a first locking portion cooperating with the second locking portion forms a recess corresponding to the protrusion.

6. The set of floor panels according to claim 5, wherein the protrusion is a bulge-shaped portion.

7. The set of floor panels according to claim 1, wherein the coupling parts on all four edges are realized in one piece from a material of the floor panels.

8. The set of floor panels according to claim 1, wherein the female coupling part at the short edge and the female coupling part at the long edge are realized substantially similar to each other and are realized identical to each other.

9. The set of floor panels according to claim 1, wherein at an underside of the female part of the long edge or the short edge a recess is present, the recess arranged to facilitate an elastic bending during joining.

10. The set of floor panels according to claim 1, wherein the set comprises first and second types of floor panels configured such that a herringbone pattern can be realized with the set of floor panels.

11. The set of floor panels as in claim 10, wherein the coupling parts of a first type of floor panels on one pair of edges are mirrored in respect to the coupling parts of the second type of floor panels at a same pair of edges.

12. The set of floor panels as in claim 10, wherein a location of the coupling parts of the one type of floor panels on one pair of edges are mirrored in respect to a location of the coupling parts of another type of floor panels at the same pair of edges.

13. A set of floor panels, wherein each floor panel of the set of floor panels is oblong rectangular and has a pair of long edges and a pair of short edges;

wherein the long edges and the short edges are provided with mechanical coupling parts arranged for coupling the floor panels of the set to each other;

wherein a first long edge of the long edges is provided with a male coupling part and a second long edge of the long edges is provided with a female coupling part;

wherein a first short edge of the short edges is provided with a male coupling part and a second short edge of the short edges is provided with a female coupling part;

wherein the male coupling part at the long edge is arranged to be inserted into the female coupling part at the long edge of a floor panel of the set by means of a turning movement;

wherein the male coupling part at the long edge is arranged to be inserted into the female coupling part at the short edge of a floor panel of the set by means of a turning movement; and wherein the male coupling part at the short edge is arranged to be inserted into the female coupling part at the long edge in one and the turning movement arranged for inserting the male coupling part at the long edge into the female coupling part at the long edge or short edge;

wherein the male coupling part at the short edge and the female coupling part at the long edge comprise locking parts arranged to, in a mutually coupled condition, effect a locking in horizontal direction and a locking in vertical direction;

wherein the female coupling part at the long edge and at the short edge comprises a lateral groove bordered by an upper lip and a lower lip, the lower lip extending distally to beyond the upper lip and is provided with an upwardly directed locking part;

wherein the male coupling part at the long edge is provided with a tongue and is arranged to cooperate with the lateral groove in order to effect a vertical locking;

wherein a proximal end of the upwardly directed locking part comprises an inclined face;

wherein a bottom of the tongue comprises a recess, wherein the recess comprises an inclined face;

wherein in a mutually coupled condition of the male coupling part of the long edge of a floor panel of the set into the female coupling part of the long edge of a floor panel of the set, the inclined face of the recess of the tongue of the male coupling part of the long edge contacts the inclined face of the upwardly directed locking part of the female coupling part of the long edge thereby defining an inclined contact plane;

wherein the inclined contact plane observed for the coupled female coupling part of the long edge is directed, as seen from a bottom of the coupled panels, in the distal direction of the coupled female coupling part of the long edge;

wherein the set of floor panels comprises at least one pair of locking portions to effect the vertical locking of the male coupling part of the short edge in the female coupling part at the long edge, a first locking portion at the male coupling part and a second locking portion, cooperating therewith in coupled condition, at the female coupling part, wherein the second locking portion present at the female coupling part, is situated at the distal end of the lower lip or of the upwardly directed locking part, whereas the first locking portion is situated at the opposite floor panel;

wherein the male coupling part at the short edge comprises a flange extending laterally at the top, a downwardly extending locking part is situated at the flange;

wherein the coupling parts on all four edges are realized in one piece from a material of the floor panels;

wherein the respective coupling parts are configured such that the first locking portion is arranged to be brought behind the second locking portion by means of a downward movement of the respective coupling part, by means of a downward snap movement.

14. The set of floor panels according to claim 13, wherein the female coupling part at the short edge and the female coupling part at the long edge are realized substantially similar to each other and are realized identical to each other.

15. The set of floor panels according to claim 13, wherein the second locking portion forms a protrusion, a first locking portion cooperating with the second locking portion forms a recess corresponding to the protrusion.

16. The set of floor panels according to claim 15, wherein the protrusion is a bulge-shaped portion.

17. The set of floor panels according to claim 13, wherein the set comprises first and second types of floor panels configured such that a herringbone pattern can be realized with the set of floor panels;

wherein the coupling parts of the first type of floor panels on one pair of edges are mirrored in respect to the coupling parts of a second type of floor panels at the same pair of edges.

18. The set of floor panels according to claim 13, wherein at an underside of the female part of the long edge or the short edge a recess is present, the recess arranged to facilitate an elastic bending during joining.

19. The set of floor panels of claim 13, wherein the male coupling part at the short edge comprises a flange extending laterally at the top, a downwardly extending locking part is situated at the flange, wherein the set of floor panels comprises at least a second pair of locking portions to effect the vertical locking of the male coupling part of the short edge in the female coupling part at the long edge, namely a third locking portion situated at the distal end of the flange or of the downwardly extending locking part, whereas the fourth locking portion is situated at the opposite floor panel.

* * * * *